(12) United States Patent
Perrault

(10) Patent No.: US 6,219,141 B1
(45) Date of Patent: Apr. 17, 2001

(54) METHOD AND APPARATUS FOR MEASURING WAVINESS OF PAPER

(75) Inventor: Jacques Perrault, Ville St-Laurent (CA)

(73) Assignee: Alliance Forest Products Inc., Montreal (CA)

( * ) Notice: Subject to any disclaimer, the term of this patent is extended or adjusted under 35 U.S.C. 154(b) by 0 days.

(21) Appl. No.: 09/481,906

(22) Filed: Jan. 12, 2000

(30) Foreign Application Priority Data

Dec. 2, 1999 (CA) .................................................. 2259807

(51) Int. Cl.$^7$ .................................................. G01N 21/84
(52) U.S. Cl. ............................................................. 356/429
(58) Field of Search ........................... 356/238, 429–431, 356/446; 250/571, 572, 559

(56) References Cited

U.S. PATENT DOCUMENTS

| 4,274,746 | 6/1981 | Cardell et al. .......................... 356/429 |
|---|---|---|
| 4,947,686 | 8/1990 | Wendell et al. ........................ 73/159 |
| 5,339,534 | 8/1994 | Krayenhagen .......................... 33/533 |

FOREIGN PATENT DOCUMENTS

| 2111842 | 1/1993 | (CA) | .............................. G01B/11/30 |
|---|---|---|---|
| 1331702 | 8/1994 | (CA) | ........................................ 73/77 |

Primary Examiner—Frank G. Font
Assistant Examiner—Michael P. Stafira
(74) Attorney, Agent, or Firm—George J. Primak

(57) ABSTRACT

The invention provides a simple and efficient method and apparatus for carrying out a quantitative measurement of waviness in a sample of paper. This is done by stretching the paper sample to the point where all waviness is removed and measuring the elongation produced at that point. The observation of waviness and its removal is facilitated by illumination of the paper sample with low incidence light while the sample is being stretched.

11 Claims, 2 Drawing Sheets

METHOD AND APPARATUS FOR MEASURING WAVINESS OF PAPER

BACKGROUND OF THE INVENTION

1. Field of the Invention

The present invention relates to a method and an apparatus for measuring waviness of paper. In particular it provides a quantitative measurement of such waviness which may be due to calendering or other operations used in the production, converting or printing of paper products.

2. Description of the Prior Art

It is well known that during the manufacture of printing paper, the latter is subjected to calendering, i.e. the paper is pressed between a series of rolls in order to improve its surface printing quality. When calendering is very intense, such as soft calendering or supercalendering, where a major reduction of the paper thickness is produced, and particularly when a small number of calendering nips is used, this may result in some waviness in the transverse direction of the paper sheet. Some of this waviness, which can also be called fluting, puckering or cockling, results in waves, wrinkles or compression lines that are permanent and will appear in the printed product where they affect the quality of the paper product by interfering with the reflection of light. This is unsatisfactory, since one of the most important features of printing paper is its gloss, namely its capacity to reflect low incidence light. Moreover, some printing processes, such as heatset offset, may aggravate the waviness of the paper because of application of heat and water during the printing operation.

Examination of various samples of soft calendered and supercalendered papers has shown various degrees of waviness, from light to heavy. The analysis of manufacturing conditions of such samples suggests a relationship between the intensity of calendering and the level of waviness. Thus, in order to better understand this phenomenon and quantify the calendering and other processing parameters, the need for a suitable method and apparatus for measuring such waviness has become apparent.

Several prior art references disclose methods and/or apparatus to measure crimp frequency in crimped material, warp measurement of surfaces such as corrugated webs or sheets, fabric extensibility, and roughness on a web of paper and the like.

Thus, U.S. Pat. No. 4,274,746 of Jun. 23, 1981 provides for the measurement of crimp frequency of crimped material by utilizing the pattern of light reflections produced by the waviness of the material.

U.S. Pat. No. 5,339,534 of Aug. 23, 1994 discloses a device to measure warpage of a surface where a dial indicator is mounted in the middle for measuring deflection of a resiliently flexible band which deflects to conform to a warped surface when placed against it.

Canadian Patent No. 1,331,702 of Aug. 30, 1994 refers to an apparatus for measuring fabric extensibility where the fabric is mounted between two clamps on a base with an arm pivotally mounted intermediate the two ends of the base for rotation about a horizontal axis. When a tensile force is applied to the fabric, it produces an angular deflection of the arm about its axis, which is measured to indicate the extension of the piece of fabric.

Also, Canadian Patent Application No. 2,111,842 laid open Jan. 1, 1993 provides for a roughness detector on a travelling surface of a web, such as paper, by directing a beam of polarized light at an angle onto the web, focused by a focal lens to illuminate a spot on the surface and then collecting a specularly reflected component of the light through a second lens focused on the spot. A detector is aligned to receive a portion of the specularly reflected collimated light and generates a signal depending on the intensity of the light to provide an indication of the roughness or smoothness of the surface.

None of these prior art references deal with the measurement of waviness in paper after calendering or the like, as is done pursuant to the present invention, nor can they be adapted for such purpose.

OBJECTS AND SUMMARY OF THE INVENTION

It is therefore an object of the present invention to provide a method and an apparatus for measuring waviness or fluting of paper resulting from calendering, particularly soft calendering and supercalendering, and other operations in the production, converting or printing of paper products.

Another object is to provide a simple and efficient method and apparatus for carrying out the aforesaid task that provides a single number to quantify the fluting intensity.

Other objects and advantages of the invention will become apparent from the following description thereof.

The waviness or fluting measured in accordance with the present invention refers to a deformation of the paper web, essentially in the cross-direction, resulting from calendering, particularly soft calendering and supercalendering, and other operations in the production, converting or printing of paper products. A portion of this deformation is permanent and some other portion may be of a temporary nature. Studies have also shown than waviness may be amplified once again by the printing process. In this state, a sample of fluted paper acts like a spring that can be extended and contracted. Thus, the sum of waves in such sample, i.e. their number and amplitude, is equal to the extension required to make the paper sample fully straight. In other words, it corresponds to the stretch required to reach full sample unwaviness. The present invention relies on the finding that the waviness produced as described above and also the straightness or unwaviness of the paper can be readily visible by means of a low incidence light projected thereon. Such low incidence light is normally projected at an angle not exceeding 20° and preferably at an angle of between 5° and 10°. The angle of incidence may also be adjustable to optimize the visibility. The method of the present invention therefore comprises stretching a sample piece of paper until it is fully straight while observing it with the help of the low incidence light, and once it is fully straight with no waviness or fluting of any kind remaining therein, measuring the elongation by means of a suitable instrument, such as a micrometer, a dial indicator or a linearly variable displacement transducer (LVDT).

It should be noted that the low incidence light used pursuant to the present invention is not employed for determining the waviness or crimp frequency as in the case of U.S. Pat. No. 4,274,746 or the roughness as in the case of Canadian Patent Application No. 2,111,842, but rather to observe that all waviness has disappeared and the paper is completely straight, at which point the elongation is measured, thus providing the exact measure of the total waviness or fluting in the sample of paper being tested.

The apparatus of the present invention comprises:

(a) a supporting table for supporting a paper sample;

(b) a holding clamp at one end of the table for clamping and holding one end of the paper sample;

(c) a tensioning clamp at the opposite end of the table for clamping and holding the other end of the paper sample;

(d) means for pulling the tensioning clamp to produce stretching of the paper sample;

(e) measuring means for measuring elongation of the paper sample produced by the stretching of said sample; and (e) a source of low incidence light for projecting such light onto the paper sample during the stretching of said sample to the point where waviness disappears and the paper is fully straight, said low incidence light being such as to facilitate visibility of the waviness in the sample and the point of its disappearance.

The size of the table should be such as to enable measurement of a long enough paper sample to provide a satisfactory evaluation of the waviness and also such that the total elongation is sufficient to obtain a precise measurement of such waviness. The measuring means may consist of a micrometer connected to the tensioning clamp, thereby providing a direct reading of the elongation of the paper sample, for instance as a percentage of the length of said sample. Such length of the sample and the size of the supporting table are, therefore, preferably chosen so that the micrometer reading would give a direct percent measurement without necessity of providing some corrective factor.

The holding clamp may comprise a lower and an upper plate as well as a bolt and a nut, such as a butterfly-nut, interconnecting the two plates. One end of the paper sample is inserted between the two plates and the bolt is tightened by the nut to clamp said end. The holding clamp may be provided with an adjusting screw in order to slightly move the holding clamp horizontally and properly position the paper sample flat on the table and remove any warpage or the like, that may exist without, however, affecting the waviness or fluting to be measured.

The tensioning clamp may again comprise a lower and an upper plate as well as a bolt and a nut, such as a butterfly-nut, interconnecting the two plates. It is mounted at the opposite end of the table so as to clamp the other end of the paper sample which is inserted between the plates and clamped by tightening the butterfly-nut. Other clamping devices can be used as the holding clamp and tensioning clamp, for instance spring loaded clamps, pneumatically loaded clamps and the like. In all cases, the inner surfaces of the clamps should provide sufficient friction to prevent any sample slippage. For example, such surfaces could have a knurled pattern or be covered with a suitable rubber or like lining. The tensioning clamp is connected to the measuring means for measuring the elongation produced by the waviness after stretching of the paper sample has been completed. If the measuring means is a micrometer, it can be connected to the tensioning plate by means of a U-shaped bracket and a bolt. The bracket is mounted so that it can slide horizontally; for instance its two parallel side arms may be placed on a sliding surface.

The measuring means may be a standard micrometer the spindle of which is connected to the bottom part of the U-shaped bracket in such a way that it can pull the bracket and with it the tensioning clamp in which one end of the paper sample is clamped. This can be done by means of a collar mounted on the spindle, preferably with a nylon disc placed between the collar and the bottom of the bracket to reduce friction. The micrometer can be held in position, for instance by means of a C-shaped bracket, so that its head is supported vertically on a suitable surface.

BRIEF DESCRIPTION OF THE DRAWINGS

A preferred embodiment of the invention will now be described with reference to the appended drawings, in which.

DESCRIPTION OF THE PREFERRED EMBODIMENT

The preferred embodiment of the invention is illustrated, but not limited, by the appended drawings where the same reference numbers are used to designate the same parts in both figures.

Figure 1:
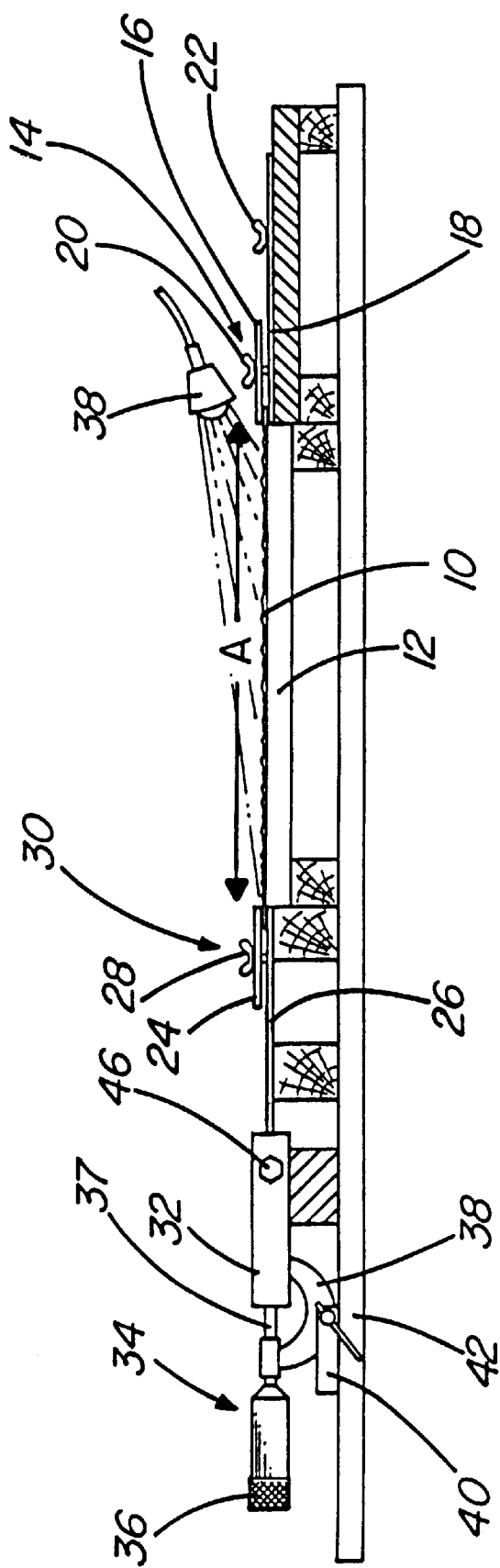
FIG. 1 is a side view of the apparatus of the present invention.

Referring to FIG. 1, it illustrates both the method and the apparatus of the present invention for measuring waviness of paper. This is done by placing a sample piece of paper 10 having waves therein, flat onto a supporting table 12.

The paper sample has a length A, such as to provide a representative measurement of the waviness of the paper. In this example, the length is 10 inches (25.4 cm) which has been found satisfactory for this purpose. The paper sample 10 is clamped at one end by means of holding clamp 14 which comprises plate 16 and plate 18 interconnected by means of a bolt (not shown) that may be tightened by a butterfly-nut 20. One end of the paper sample 10 is inserted between plates 16 and 18 and the nut 20 is thereafter tightened until said end is firmly clamped and held between said plates. If the paper sample 10 is not positioned entirely flat on the table 12 but shows some warpage or the like, an adjusting bolt-nut combination 22 is provided to enable movement of plate 18 to such extent as to remove any such warpage, but without affecting the waviness of the paper sample 10 to be measured.

The opposite end of the paper sample 10 is likewise clamped between plates 24 and 26 interconnected by a bolt with a tightening butterfly-nut 28 forming a tensioning clamp 30. The lower plate 26 of this tensioning clamp 30 is connected via bracket 32 to the micrometer 34 so that by turning thimble 36 of the micrometer 34, the paper sample 10 may be stretched until all waves or wrinkles present therein disappear and the paper is completely straight. This point is readily observed due to the illumination of the paper sample by means of a source of low incidence light 38 placed at a suitable angle to the paper sample 10, in this case at an angle of 10°. This is one of the basic features of the present invention, since it is important to provide just enough tensioning of the paper sample 10 to remove all waves or wrinkles from the paper and render the paper sample straight without, however, further stretching the paper. It has been found that this can be well observed with the use of the low incidence light projected onto the paper sample 10 as described above. The angle of incidence can be adjusted to optimize the visibility of waviness by the operator.

Figure 2:
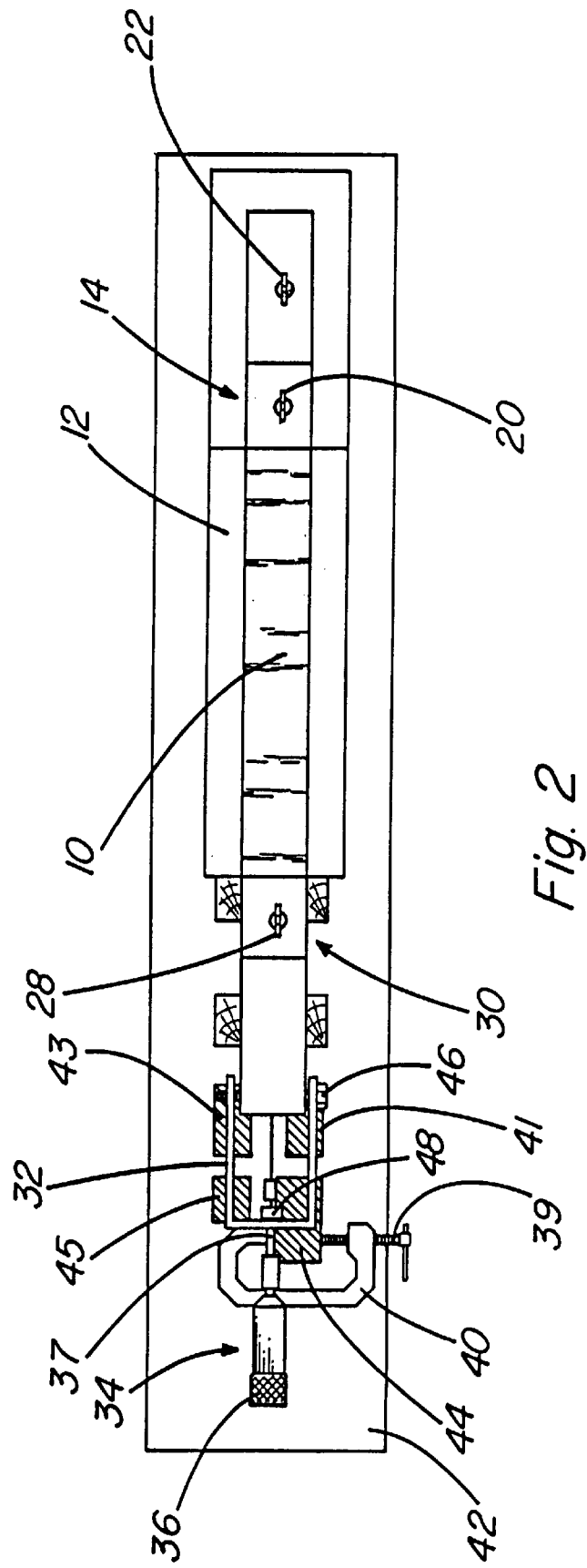
FIG. 2 is a top view of the apparatus shown in FIG. 1, without the light source.

The head 38 of the micrometer 34 is held in a vertical position by clamp 40 on the base 42. As shown in FIG. 2, clamp 40 is a C-shaped clamp having a tightening bolt 39 which allows to clamp the micrometer head 38 against a block 44 provided for this purpose. The bracket 32 is a U-shaped bracket connected to the clamp 30 by means of bolt 46 at its top or open end, while its bottom end is connected to the spindle 37 of the micrometer 34 by means of collar 48 and a nylon disc placed between this collar 48 and the bottom of the U-shaped bracket 32. This bracket 32 is slidably supported on blocks 41, 43, 44 and 45.

The measuring operation proceeds as follows:

At the start of the operation, the gauge of the micrometer 34 is set to "zero", while making sure that the tensioning clamp 30 abuts the end of the supporting table 12 and also that the collar 48 provides a good connection between the bracket 32 and the spindle 37 of the micrometer 34. Then, the paper sample 10 is cut to an appropriate size. With table 12 being 10 inches (25.4 cm) long, the paper sample is cut to have a length of 11 inches (28 cm) and a width of 2 inches (5.1 cm). At least three such samples should be provided and tested to have a representative measurement.

Then the holding clamp 14 is opened and the end of the paper sample 10 is inserted between plates 16 and 18 thereof. Thereafter, the tensioning clamp 30 is opened and the other end of the paper sample 10 is inserted between plates 24 and 26 thereof. The paper sample 10 is then properly centered between the two clamps 14 and 30 and the holding clamp 14 is tightened by means of the butterfly-nut 20 to clamp the end of said paper sample 10 therein. Making sure that the paper sample 10 is lying flat on the table 12, the tensioning clamp 30 is tightened at the other end of the table 12 by means of the butterfly-nut 28 to clamp said end therein. The sample 10 should lie flat on the table 12 to get an accurate reading. If there is some warpage, looseness or the like, one can use the adjusting bolt-nut 22 to slightly move the holding clamp 14 horizontally until full flatness of the paper sample 10 on the table 12 is achieved without, however, overstretching the paper sample and thereby removing some of the waviness to be measured.

Once the paper sample 10 is properly in place on the table 12 and clamped between clamps 14 and 30, a low incidence light is projected thereon from the light source 38 which is positioned above the holding clamp 14 so that the light is directed toward the tensioning end of the paper sample. This could be achieved using any suitable light source, including a flashlight.

The angle at which the light is so projected is such as to permit good observation of the waviness of the paper sample 10 as well as of the point of disappearance of said waviness when the sample has been sufficiently stretched. Normally, it is between 0° and 20° and preferably between 5° and 10°, and is adjustable, if desired.

The thimble 36 of the micrometer is then turned so as to pull the spindle 37 and thereby stretch the paper sample 10 until a point is reached when all waviness has disappeared and stopping at this precise point. Using a micrometer that has dimensions from 0–1 inch (0–2.54 cm), this would produce a certain gauge reading, for instance 0.057 inch. This displacement gives a direct reading of an extension of the paper sample of 0.57%. This corresponds to the percentage of the waviness of the sample. Such measurement will allow the operator to determine whether the calendering or other operation in the manufacture of the paper needs adjustments due to excess waviness.

It should be understood that the invention is not limited to the specific embodiments described above, but that many modifications obvious to those skilled in the art can be made without departing from the spirit of the invention and the scope of the following claims.

What is claimed is:

1. Method of measuring waviness of paper, which comprises:

(a) stretching a sample of the paper while projecting a low incidence light on said sample;

(b) observing said sample while it is being stretched under a low incidence light that facilitates visibility of the waviness, and stopping the stretching operation as soon as all waviness has disappeared and the paper sample becomes straight; and (c) measuring the elongation of the paper sample produced by the stretching operation.

2. Method according to claim 1, in which the stretching is carried out while the sample is placed flat on a supporting table and is clamped at one end of the table by a holding clamp and at the other end of said table by a tensioning clamp which is pulled to produce the stretching.

3. Method according to claim 1, in which the low incidence light is projected onto the sample from an angle of up to 20°, said angle being adjustable to optimize the visibility of the waviness.

4. Method according to claim 3, in which said angle is between 5° and 10°.

5. Method according to claim 2, in which measuring means are connected to the tensioning clamp and the measurement of the elongation of the paper sample is done directly by said measuring means.

6. Method according to claim 5, in which the measuring means is a micrometer which is used both for pulling of the tensioning clamp, thereby producing the stretching of the paper sample, and for measuring the elongation obtained by such stretching operation.

7. Apparatus for measuring waviness of paper, which comprises:

(a) a supporting table for supporting a sample of the paper;

(b) a holding clamp at one end of said table for clamping and holding one end of the paper sample;

(c) a tensioning clamp at the opposite end of the table for clamping and holding the other end of the paper sample;

(d) means for pulling the tensioning clamp to produce stretching of the paper sample;

(e) measuring means for measuring elongation of the paper sample produced by the stretching of said sample; and (f) a source of low incidence light for projecting such light unto the paper sample during stretching of said sample to the point where waviness disappears and the paper is fully straight, said low incidence light being such as to facilitate visibility of the waviness in the sample and the point of its disappearance.

8. Apparatus according to claim 7, in which there are further provided adjustment means adapted to adjust the position of the paper sample on the table to make it perfectly flat, but without affecting the waviness to be measured.

9. Apparatus according to claim 6, in which the tensioning clamp is connected by means of a suitable bracket to the measuring means.

10. Apparatus according to claim 9, in which the measuring means and pulling means consist of a micrometer which is so connected to the tensioning clamp that by operating said micrometer the tensioning clamp is pulled, thereby producing stretching of the paper sample, and the obtained elongation is directly measured by said micrometer.

11. Apparatus according to claim 6, in which the source of low incidence light is positioned generally above the holding clamp so as to project the low incidence light onto the paper sample at an adjustable angle of up to 20°.

* * * * *